[12] United States Patent
Tadachi

(10) Patent No.: US 11,681,212 B2
(45) Date of Patent: Jun. 20, 2023

(54) LIGHT EMITTING ELEMENT, METHOD OF MANUFACTURING LIGHT EMITTING ELEMENT, AND PROJECTOR

(71) Applicant: SEIKO EPSON CORPORATION, Tokyo (JP)

(72) Inventor: Kei Tadachi, Matsumoto (JP)

(73) Assignee: Seiko Epson Corportation, Tokyo (JP)

( * ) Notice: Subject to any disclaimer, the term of this patent is extended or adjusted under 35 U.S.C. 154(b) by 16 days.

(21) Appl. No.: 17/331,692

(22) Filed: May 27, 2021

(65) Prior Publication Data

US 2021/0373425 A1 Dec. 2, 2021

(30) Foreign Application Priority Data

May 29, 2020 (JP) .............................. JP2020-094001

(51) Int. Cl.
G03B 21/20 (2006.01)
(52) U.S. Cl.
CPC .................................. G03B 21/208 (2013.01)
(58) Field of Classification Search
None
See application file for complete search history.

(56) References Cited

U.S. PATENT DOCUMENTS

2005/0001998 A1\* 1/2005 Tsubata ................ H04N 9/3141
353/100
2009/0002639 A1\* 1/2009 Corn .................... G03B 21/006
353/31

FOREIGN PATENT DOCUMENTS

JP 2004-013061 A 1/2004
JP 2013044765 A \* 3/2013
JP 2014-006322 A 1/2014

\* cited by examiner

Primary Examiner — Sultan Chowdhury
Assistant Examiner — Danell L Owens
(74) Attorney, Agent, or Firm — Dority & Manning, P.A.

(57) ABSTRACT

An optical element according to the present disclosure includes a main body part including an optical part having an optical surface, and a support part which is provided to the optical part, and which is to be supported by a support body, and a functional layer which is provided as a film to the main body part, wherein the functional layer is disposed so as to cover the optical surface of the optical part, and so as not to cover at least a part of the support part.

13 Claims, 6 Drawing Sheets

LIGHT EMITTING ELEMENT, METHOD OF MANUFACTURING LIGHT EMITTING ELEMENT, AND PROJECTOR

The present application is based on, and claims priority from JP Application Serial Number 2020-094001, filed May 29, 2020, the disclosure of which is hereby incorporated by reference herein in its entirety.

BACKGROUND

1. Technical Field

The present disclosure relates to a light emitting element, a method of manufacturing a light emitting element, and a projector.

2. Related Art

In the past, when coating an optical element such as a lens with a functional film, it is necessary to support the optical element regardless of which one of a dry process and a wet process being used. In the technology disclosed in, for example, JP-A-2014-6322, the lens is held using a lens holding member, and the functional film is formed on the entire surface of the lens using a dip coating method.

However, in the related art described above, there is a problem that a coating liquid does not sufficiently adhere to a part where the lens holding member and the lens have contact with each other, and thus, there occurs a film formation failure in the functional film.

SUMMARY

In view of the problems described above, according to a first aspect of the present disclosure, there is provided an optical element including a main body part including an optical part having an optical surface, and a support part which is provided to the optical part, and which is to be supported by a support body, and a functional layer which is provided as a film to the main body part, and which has a function, wherein the functional layer is disposed so as to cover at least the optical surface of the optical part, and so as not to cover at least a part of the support part.

According to a second aspect of the present disclosure, there is provided a method of manufacturing an optical element having a main body part including an optical part and a support part, and a functional layer, the method including a film formation step of providing a film of the functional layer to the main body part, wherein in the film formation step, the support part is supported by a support body to thereby hold the main body part, and the functional layer is provided to the main body part so as to cover at least the optical surface of the optical part, and so as not to cover at least a part at an optical surface side of the support part.

According to a third aspect of the present disclosure, there is provided a projector including a light source device including the optical element according to the first aspect of the present disclosure, a light modulation device configured to modulate light from the light source device in accordance with image information, and a projection optical device configured to project the light modulated by the light modulation device.

DESCRIPTION OF AN EXEMPLARY EMBODIMENT

An embodiment of the present disclosure will hereinafter be described using the drawings.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

Figure 1:
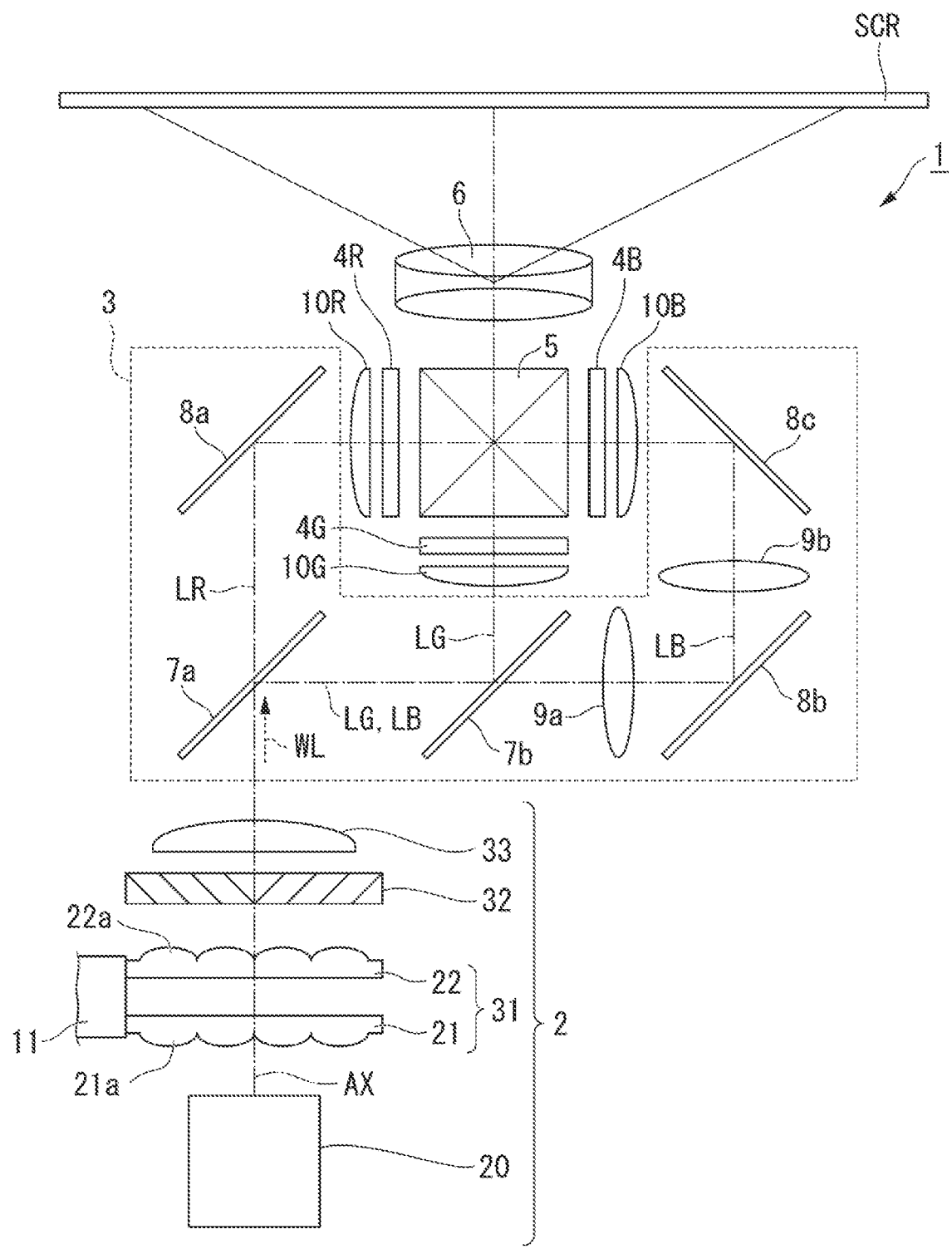
FIG. 1 is a diagram showing a configuration of a projector according to an embodiment.

FIG. 1 is a diagram showing a configuration of the projector according to the present embodiment.

The projector 1 according to the present embodiment shown in FIG. 1 is a projection-type image display device for displaying a color image on a screen SCR. The projector 1 uses three light modulation devices corresponding to respective colored light beams, namely red light LR, green light LG, and blue light LB.

The projector 1 is provided with a light source device 2, a color separation optical system 3, a light modulation device 4R, a light modulation device 4G, a light modulation device 4B, a combining optical system 5, and a projection optical device 6.

The light source device 2 emits illumination light WL having a white color toward the color separation optical system 3. The color separation optical system 3 separates the illumination light WL having a white color into the red light LR, the green light LG, and the blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from, and transmits the blue light LB.

The first reflecting mirror 8a is disposed in the light path of the red light LR, and the red light LR which has been transmitted through the first dichroic mirror 7a is reflected by the first reflecting mirror 8a toward the light modulation device 4R. Meanwhile, the second reflecting mirror 8b and the third reflecting mirror 8c are disposed in the light path of the blue light LB, and the blue light LB which has been transmitted through the second dichroic mirror 7b is reflected toward the light modulation device 4B. Further, the green light LG is reflected by the second dichroic mirror 7b toward the light modulation device 4G.

The first relay lens 9a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are disposed polarization plates (not shown), respectively, and thus, there is formed a configuration of transmitting only the linearly polarized light with a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB which enter the light modulation device 4R, the light modulation device 4G, and the light modulation device 4B, respectively.

The combining optical system 5 combines the image light corresponding respectively to the red light LR, the green light LG, and the blue light LB with each other in response to incidence of the image light respectively emitted from the light modulation device 4R, the light modulation device 4G, and the light modulation device 4B, and then emits the image light thus combined toward the projection optical device 6. As the combining optical system 5, there is used, for example, a cross dichroic prism.

The projection optical device 6 is constituted by a plurality of projection lenses. The projection optical device 6 projects the image light having been combined by the combining optical system 5 toward the screen SCR in an enlarged manner. Thus, an image is displayed on the screen SCR.

The light source device 2 according to the present embodiment is provided with a light source 20, an integrator optical system 31, a polarization conversion element 32, and a superimposing optical system 33. In the present embodiment, a known constituent such as a lamp, an LED, or a semiconductor laser is used as the light source 20, and the light source 20 emits the illumination light WL having a white color. Further, as the light source 20, it is possible to adopt a light source for performing wavelength conversion on excitation light emitted from the LED or the semiconductor laser to thereby generate fluorescence.

The integrator optical system 31 is provided with a first multi-lens array 21, and a second multi-lens array 22. The first multi-lens array 21 and the second multi-lens array 22 are supported by the support member 11 disposed in the projector 1.

The first multi-lens array 21 and the second multi-lens array 22 are each formed of an optical element according to the present disclosure. The illumination light WL having been transmitted through the integrator optical system 31 enters the polarization conversion element 32. The polarization conversion element 32 is constituted by polarization split films and wave plates arranged in an array. The polarization conversion element 32 uniforms the polarization direction of the illumination light WL into a predetermined direction. Specifically, the polarization conversion element 32 uniforms the polarization direction of the illumination light WL into a direction of a transmission axis of the incident side polarization plate of each of the light modulation devices 4R, 4G, and 4B.

Thus, the polarization direction of the red light LR, the green light LG, and the blue light LB obtained by separating the illumination light WL having been transmitted through the polarization conversion element 32 coincides with the transmission axis direction of the incident side polarization plate of each of the light modulation devices 4R, 4G, and 4B. Therefore, the red light LR, the green light LG, and the blue light LB enter the image formation areas of the light modulation devices 4R, 4G, and 4B, respectively, without being blocked by the incident side polarization plates, respectively.

Figure 2:
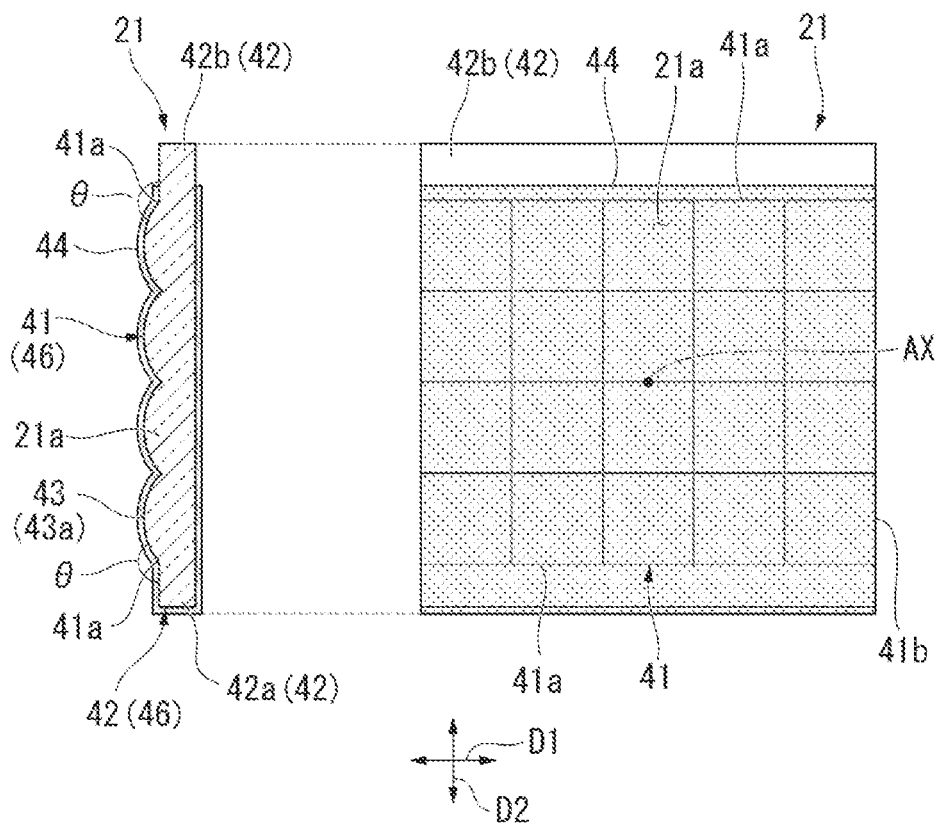
FIG. 2 is a diagram showing a configuration of an essential part of a first multi-lens array.

The first multi-lens array 21 and the second multi-lens array 22 have respective structures substantially the same as each other. Therefore, citing the first multi-lens array 21 as an example, the structure thereof will hereinafter be described. FIG. 2 is a diagram showing a configuration of an essential part of the first multi-lens array 21. A left-hand diagram in FIG. 2 shows a cross-sectional view of the first multi-lens array 21. A right-hand diagram in FIG. 2 is a front view of the first multi-lens array 21 viewed from a direction along an optical axis AX.

As shown in FIG. 2, the first multi-lens array 21 is provided with a lens main body (a main body part) 46, and a functional layer 44 having a function. The lens main body 46 includes an optical part 41 and a support part 42. The functional layer 44 is formed so as to cover the surface of the lens main body 46 using the film formation step described later.

The optical part 41 in the present embodiment is a lens. Specifically, the optical part 41 is a multi-lens having a multi-lens surface (an optical surface) 43. The multi-lens surface 43 is formed of a plurality of lens surfaces 43a. The support part 42 is disposed integrally with the optical part 41.

Specifically, the first multi-lens array 21 in the present embodiment has a plurality of first small lenses 21a. The surfaces of the first small lenses 21a are respectively formed of the lens surfaces 43a of the multi-lens surface 43. It should be noted that a surface at the opposite side to the multi-lens surface 43 in the optical part 41 is formed of a flat surface.

In the present embodiment, the surface of the first small lens 21a and the image formation area of each of the light modulation devices 4R, 4G and 4B are conjugated with each other. Further, the shape of each of the first small lenses 21a is a rectangular shape substantially similar to the shape of each of the image formation areas of the light modulation devices 4R, 4G, and 4B. Thus, each of the partial light beams emitted from the first multi-lens array 21 efficiently enters each of the image formation areas of the light modulation devices 4R, 4G, and 4B.

The support part 42 is a region which is supported by an arm part described later or the support member. The support part 42 is supported by the arm part to thereby set the state in which the lens main body 46 can be held in the manufacturing process, and sets the state in which the lens main body 46 can be supported by the support member 11 in the projector 1 according to the present embodiment. In other words, it is possible to hold the support part 42 with an arm as a support body in the manufacturing process, and it is possible to support the optical element (the lens main body 46) with the support member as the support body in the projector 1 according to the present embodiment.

The planar shape of the optical part 41 in the first multi-lens array 21 is a rectangular shape. The optical part 41 has a pair of first end side portions 41a, 41a along a first direction D1, and a pair of second end side portions 41b, 41b along a second direction D2 crossing the first direction D1. In the present embodiment, the first direction D1 corresponds to a left-right direction in FIG. 2, and the second direction D2 corresponds to an up-down direction in FIG. 2.

The support part 42 in the present embodiment includes a first region 42a and a second region 42b. The first region 42a and the second region 42b are respectively disposed in the pair of first end side portions 41a, 41a of the optical part 41. The first region 42a and the second region 42b are respectively disposed throughout the entire areas of the first end side portions 41a, 41a.

In the present embodiment, the first region 42a and the second region 42b each have a plate-like shape having a flat surface. In other words, the first region 42a and the second region 42b are each a planar part.

The optical part 41 (the multi-lens surface 43) and the support part 42 are disposed so that the respective end surfaces cross each other with an obtuse angle θ formed therebetween. In other words, the optical part 41 and the support part 42 are disposed so that the end surfaces of the first end side portion 41a and the first region 42a cross each other with the obtuse angle, and the end surfaces of the first end side portion 41a and the second region 42b cross each other with the obtuse angle.

In the present embodiment, a width in a direction (the second direction D2) crossing an extending direction (the first direction D1) of each of the first region 42a and the second region 42b is set to a length not smaller than 1/20 and not larger than 1/2 with respect to a width in the second direction D2 of the optical part 41. By setting the width of each of the first region 42a and the second region 42b within the range described above, it is possible to stably support the support part 42 with a supporting jig described later.

The functional layer 44 covering the lens main body 46 is disposed so as to cover at least the multi-lens surface 43 of the optical part 41, and at the same time, not to cover at least a part of the support part 42. Specifically, the functional layer 44 is disposed so as to cover the whole of the optical part 41. Further, the functional layer 44 is disposed so as to cover only the whole of the first region 42a and the neighborhood of the optical part 41 in the second region 42b. In other words, the functional layer 44 is provided to the first multi-lens array 21 in a state of not covering a part of the support part 42. In the present embodiment, the support part 42 has a part where the functional layer 44 is not disposed.

It should be noted that the part where the functional layer 44 is not disposed in the support part 42 corresponds to the support part supported by the arm part described later when manufacturing the first multi-lens array 21.

The functional layer 44 is disposed so as to cover the multi-lens surface 43 of the optical part 41, and at the same time, not to cover a part of the support part 42 in the present embodiment, but this is not a limitation, and it is possible for the functional layer 44 to be disposed so as not to cover the whole of the support part 42.

The functional layer 44 can be formed of a light transmissive material such as $SiO_2$ or SiON. The functional layer 44 in the present embodiment is formed of, for example, $SiO_2$. The functional layer 44 in the present embodiment has a function as a planarization film for planarizing the multi-lens surface 43 as described later. It should be noted that the functional layer 44 which functions as the planarization film can be formed of silicone in a liquid form, COP (cycloolefin polymer), or acrylic.

It should be noted that it is possible for the functional layer 44 to be formed by combining a plurality of layers having respective functions different from each other. The functional layer 44 can include, for example, an antireflection layer disposed on the light transmissive material ($SiO_2$) forming the planarization film described above. The antireflection layer is a film for reducing the surface reflection by the multi-lens surface 43, and is formed of a coating film made of, for example, $SiO_2$, $MgF_2$, $Nb_2O_5$, $Ti_3O_5$, $Ta_2O_5$, $Al_2O_3$, or $ZrO_2$.

Although not shown in the drawings, the second multi-lens array 22 has the lens main body 46 and the functional layer 44 similarly to the first multi-lens array 21 described above. As shown in FIG. 1, the second multi-lens array 22 includes a plurality of second small lenses 22a corresponding to the plurality of first small lenses 21a of the first multi-lens array 21. The second multi-lens array 22 forms images of the respective first small lenses 21a of the first multi-lens array 21 in the vicinity of each of the image formation areas of the respective light modulation devices 4R, 4G, and 4B in cooperation with the superimposing optical system 33.

Then, a method of manufacturing the first multi-lens array 21 and the second multi-lens array 22 having the configurations described above will be described. The description will hereinafter be presented citing the method of manufacturing the first multi-lens array 21 as an example.

The method of manufacturing the first multi-lens array 21 has a film formation step for providing a film of the functional layer 44 to the lens main body 46. The film formation step is a process for providing the film of the functional layer 44 to the lens main body 46 shown in FIG. 2.

The method of manufacturing the first multi-lens array 21 in the present embodiment is provided with the film formation step of supporting the support part 42 with the support body to thereby hold the lens main body 46 in the supported state, and then forming the film of the functional layer 44 so as to cover at least the multi-lens surface 43 of the optical part 41 and so as not to cover at least a part of the support part 42. In the method of manufacturing the first multi-lens array 21 in the present embodiment, the film of the functional layer 44 is formed by a dip coating method.

Figure 3:
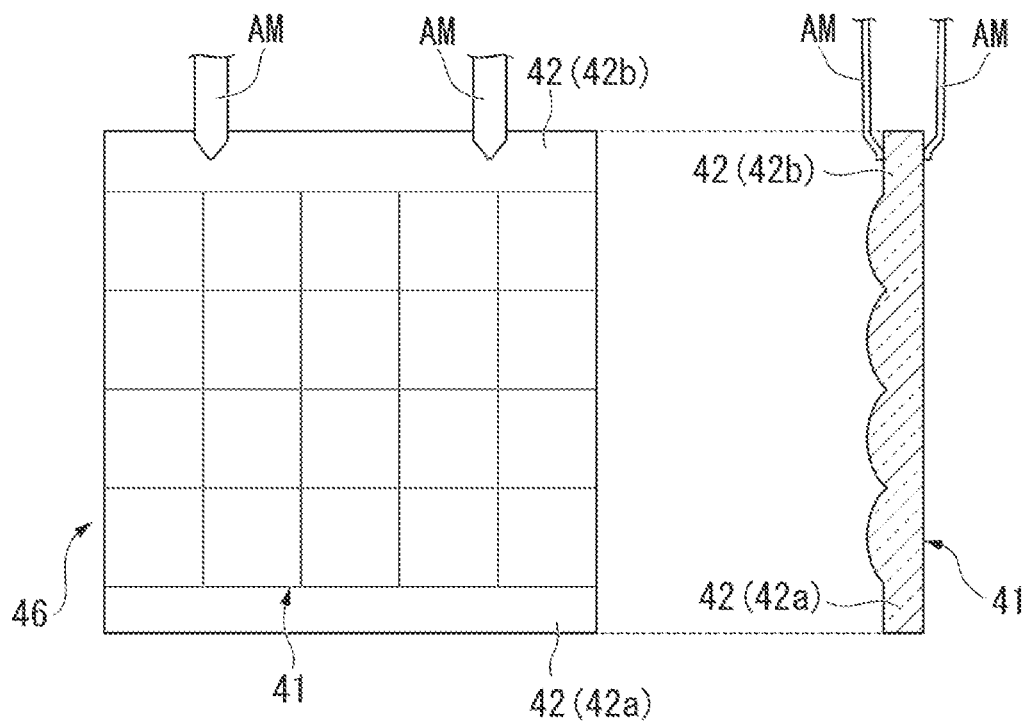
FIG. 3 is a diagram showing a film formation step of a functional layer.
Figure 4:
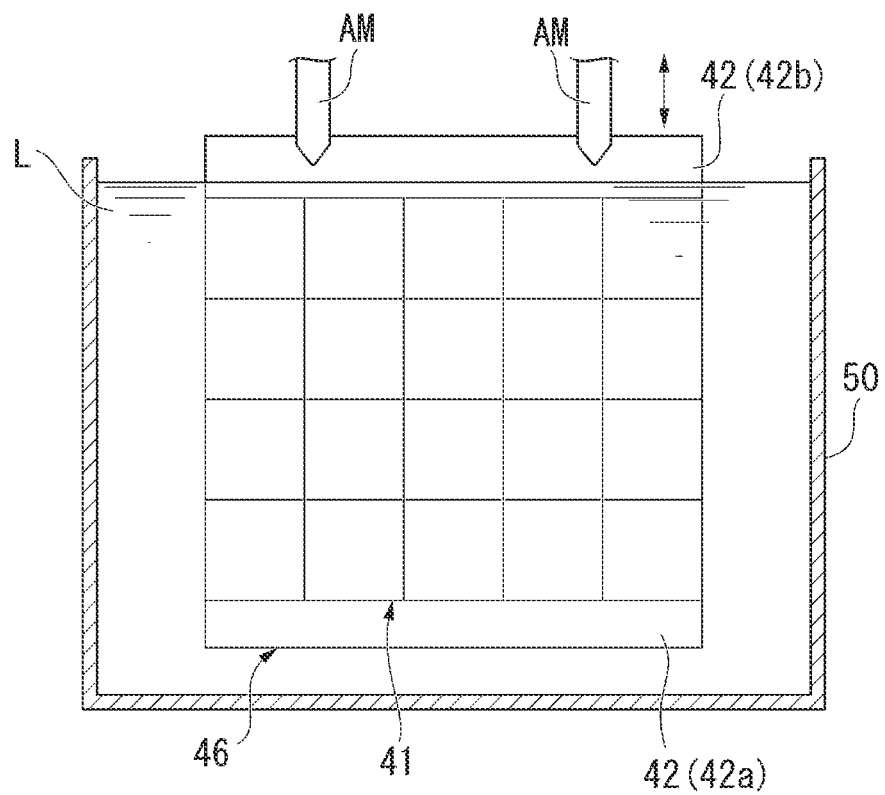
FIG. 4 is a diagram showing the film formation step of the functional layer.

FIG. 3 and FIG. 4 are diagrams showing the film formation step of the functional layer 44.

In the film formation step, as shown in FIG. 3, the lens main body 46 is supported by the arm part (support body) AM. Specifically, the arm part AM grasps (supports) the second region 42b of the support part 42 to thereby hold the lens main body 46 in the supported state.

Then, as shown in FIG. 4, the arm part AM moves the optical part 41 in the supported state downward at a speed of, for example, 10 mm/sec into a liquid bath 50 containing a solution L including polysilazane to dip the optical part 41 into the solution L. On this occasion, the arm part AM dips the lens main body 46 into the solution L so as to prevent the solution L from adhering to the arm part AM. Specifically, the lens main body 46 is dipped into the solution L so as to be in the state in which a part of the second region 42b grasped by the arm part AM is exposed. Here, in the present embodiment, the optical part 41 and the support part 42 (the first region 42a and the second region 42b) are disposed so that the respective end parts cross each other with the obtuse angle θ formed therebetween. Therefore, it becomes difficult for a retained liquid of the solution L to occur in a boundary portion between the optical part 41 and the support part 42.

After a predetermined time elapses, the arm part AM raises the lens main body 46 at a speed of, for example, 1 mm/sec to take the lens main body 46 out from the solution L. Then, by drying and burning the lens main body 46 with the solution L adhered at 500° C. for 2 hours, the functional layer 44 made of SiO₂ is formed on the surface of the lens main body 46. The functional layer 44 is formed so as to cover the portion (see FIG. 4) with the solution L adhered in the lens main body 46.

In such a manner as described hereinabove, the first multi-lens array 21 in the present embodiment is manufactured. According to the method of manufacturing the first multi-lens array 21 in the present embodiment, the functional layer 44 is formed in the state of covering the whole of the optical part 41 in the lens main body 46. Further, the functional layer 44 is formed in the state of covering the first region 42a of the support part 42 in the lens main body 46, and a portion at the lower side of the portion supported by the arm part AM in the second region 42b thereof. In other words, according to the method of manufacturing the first multi-lens array 21 in the present embodiment, it is possible to form the film of the functional layer 44 so as to cover the whole of the optical part 41, and at the same time, so as not to cover at least a part (the portion supported by the arm part AM) of the support part 42.

Here, the lens main body 46 constituting the multi-lens array 21 in the present embodiment is manufactured using, for example, a molding method of transferring the metal mold shape. The lens main body 46 manufactured using the molding method described above becomes in the state in which the microscopic asperity on the surface of the metal mold is also transferred to the lens main body 46. Therefore, in particular on the surface (the multi-lens surface 43) of the optical part 41 of the lens main body 46, there is formed the asperity (not shown) caused by the surface shape of the metal mold.

In the present embodiment, since the functional layer 44 is formed using the dip coating method as described above, even when there is the asperity formed on the multi-lens surface 43 as a foundation, or a defect such as a porous void which cannot be removed by etching or polishing, it is possible for the functional layer 44 to easily fill the asperity or the defect without a gap in a short time due to a capillary action. In other words, the functional layer 44 is formed so as to get into the asperity provided to the multi-lens surface 43. According to the functional layer 44 in the present embodiment, the functional layer 44 functions as a planarization film for planarizing the asperity of the multi-lens surface 43 of the optical part 41. Further, the functional layer 44 fills the microscopic asperity of the multi-lens surface 43 to thereby make it possible to increase the mechanical strength of the first multi-lens array 21.

Advantages of Embodiment

The first multi-lens array 21 and the second multi-lens array 22 of the present embodiment are each provided with the lens main body 46 including the optical part 41 having the multi-lens surface 43, and the support part 42 which is provided to the optical part 41 and can be supported by the arm part AM, and the functional layer 44 which is provided to the lens main body 46, and has a function which is predetermined, and the functional layer 44 is disposed so as to cover at least the multi-lens surface 43 of the optical part 41, and at the same time, so as not to cover at least a part of the support part 42.

According to the first multi-lens array 21 and the second multi-lens array 22 in the present embodiment, there is provided the lens main body 46 including the support part 42 having the portion not covered with the functional layer 44. The portion where the functional layer 44 is not formed in the support part 42 can be supported by the arm part AM when forming the film of the functional layer 44. Since the arm part AM is capable of supporting the lens main body 46 in the state where the arm part AM does not have contact with the multi-lens surface 43 of the optical part 41, the film formation failure of the functional layer 44 due to the arm part AM is prevented from occurring, and thus, it is possible to form the film of the functional layer 44 at a predetermined position in the multi-lens surface 43. Therefore, it is possible to provide the first multi-lens array 21 and the second multi-lens array 22 in which the film formation failure of the functional layer 44 is suppressed, and which are high in reliability.

Further, since the film of the functional layer 44 is not formed in the support portion by the arm part AM, there is no chance that the functional layer formation material (the solution L) adheres to the arm part AM when forming the functional layer 44. Therefore, the cleaning process of the arm part AM after forming the film of the functional layer 44 becomes unnecessary, and as a result, the reduction in cost of the first multi-lens array 21 and the second multi-lens array 22 is achieved.

In general, a multi-lens for a projector is different in size or the number of lenses in the multi-lens surface by the model. Therefore, when providing the film of the functional layer to the multi-lenses for a projector, it is necessary to individually prepare the supporting jig (the support body) corresponding to the shape of each of the multi-lenses.

In contrast, according to the first multi-lens array 21 and the second multi-lens array 22 in the present embodiment, since the arm part AM is provided with the support part 42 which can be supported, the arm part AM can commonly be used also when the number of the lenses partitioned of the optical part 41 (the multi-lens surface 43) or the lens shape is made different.

In the present embodiment, the planar shape of the optical part 41 is a rectangular shape, the optical part 41 has the first end side portions 41a along the first direction D1, and the second end side portions 41b along the second direction D2 crossing the first direction D1, and the support part 42 is disposed in the first end side portions 41a. It is desirable for the support part to be disposed throughout the entire area of the first end side portion 41a.

According to this configuration, since the support part 42 is disposed only in the first end side portion 41a, it is possible to make the dimension of the lens main body 46 in the first direction D1 small. Thus, the first multi-lens array 21 and the second multi-lens array 22 can be reduced in size.

In the present embodiment, the support part 42 includes the planar part.

According to this configuration, it is possible for the arm part AM to support the optical part 41 in a stable state.

In the present embodiment, the optical part 41 and the support part 42 are disposed so that the respective end parts cross each other with the obtuse angle.

According to this configuration, when forming the film of the functional layer 44 using the dip coating method, it becomes difficult for the retained liquid to occur in the boundary portion between the optical part 41 and the support part 42. Therefore, it is possible to form the film of the functional layer 44 having a uniform film thickness.

In the present embodiment, the functional layer 44 includes the planarization film for planarizing the multi-lens surface 43.

According to this configuration, by filling the microscopic asperity of the multi-lens surface 43 with the functional layer 44, it is possible to increase the mechanical strength of the multi-lens surface 43.

The method of manufacturing the first multi-lens array 21 and the second multi-lens array 22 according to an aspect of the present disclosure has the film formation step of forming the film of the functional layer 44 on the optical part 41 having the multi-lens surface 43, and supports the support part 42 with the arm part AM to thereby hold the optical part 41 in the supported state, and then forms the film of the functional layer 44 so as to cover at least the multi-lens surface 43 of the optical part 41 and at the same time so as not to cover at least a part of the support part 42 at the multi-lens surface 43 side in the film formation step.

According to the method of manufacturing the first multi-lens array 21 and the second multi-lens array 22 in the present embodiment, it is possible to form the film of the functional layer 44 on the lens main body 46 in the state of supporting the support part 42 with the arm part AM. On this occasion, since the arm part AM does not make contact with the multi-lens surface 43 of the optical part 41, the film formation failure of the functional layer 44 due to the arm part AM is prevented from occurring, and thus, it is possible to form the film of the functional layer 44 at a predetermined position in the multi-lens surface 43. Therefore, it is possible to manufacture the first multi-lens array 21 and the second multi-lens array 22 in which the film formation failure of the functional layer 44 is suppressed, and which are high in reliability.

The projector 1 according to the embodiment is provided with the light source device 2 including the first multi-lens array 21 and the second multi-lens array 22 described above, the light modulation devices 4R, 4G, and 4B for modulating the light from the light source device 2 in accordance with the image information, and the projection optical device 6 for projecting the light modulated by the light modulation devices 4R, 4G, and 4B.

According to the projector 1 related to the present embodiment, since there is provided the light source device 2 including the first multi-lens array 21 and the second multi-lens array 22 in which the film formation failure of the functional layer 44 is suppressed, it is possible to enhance the reliability of the projector itself.

In the present embodiment, there is provided the support member 11 for supporting the first multi-lens array 21 and the second multi-lens array 22, and the first multi-lens array 21 and the second multi-lens array 22 are supported by the support member 11 in the support part 42.

According to this configuration, since the support part 42 which is not used as the lens in the first multi-lens array 21 and the second multi-lens array 22 can be used as a support structure for the projector 1, the trouble of separately providing the support part is saved, and it is possible to achieve the reduction in size and the reduction in cost.

It should be noted that the scope of the present disclosure is not limited to the embodiment described above, but a variety of modifications can be provided thereto within the scope or the spirit of the present disclosure.

Figure 5:
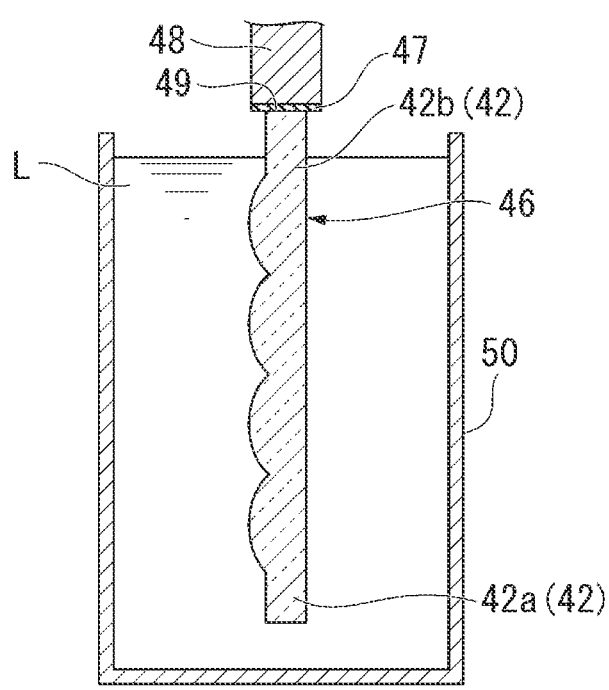
FIG. 5 is a diagram showing a support method related to a modified example of an optical component.

For example, there is cited when using the arm part AM for grasping the support part 42 as the support body for supporting the lens main body 46 as an example in the embodiment described above, but the method of supporting the lens main body 46 is not limited thereto. For example, it is possible to arrange that the lens main body 46 is supported by a support body 48 bonded to an end surface 49 of the support part 42 via an adhesive layer 47 as shown in FIG. 5.

Further, there is cited the dip coating method as an example of the method of forming the film of the functional layer 44 in the embodiment described above, but the method of forming the film of the functional layer 44 is not limited thereto. For example, it is also possible to use a spin coating method or a spray coating method as the method of forming the film of the functional layer 44.

Figure 6A:
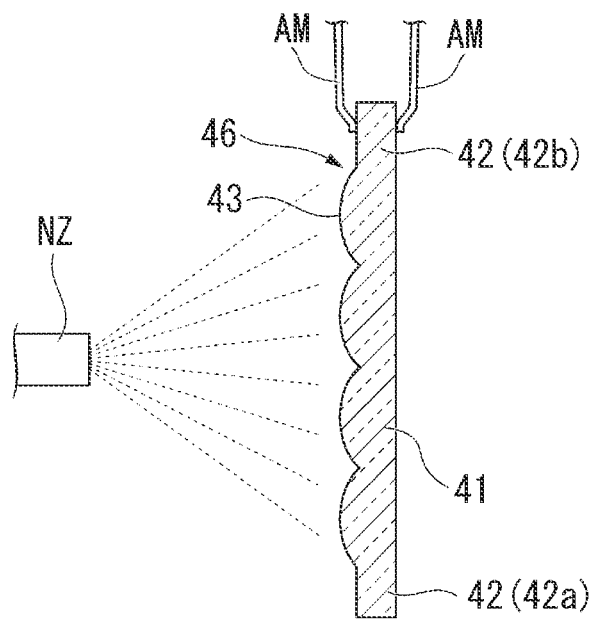
FIG. 6A is a diagram showing a configuration example of performing spray coating on one surface of the optical component.
Figure 6B:
FIG. 6B is a diagram showing a functional layer formed by the spray coating shown in FIG. 6A.
Figure 7A:
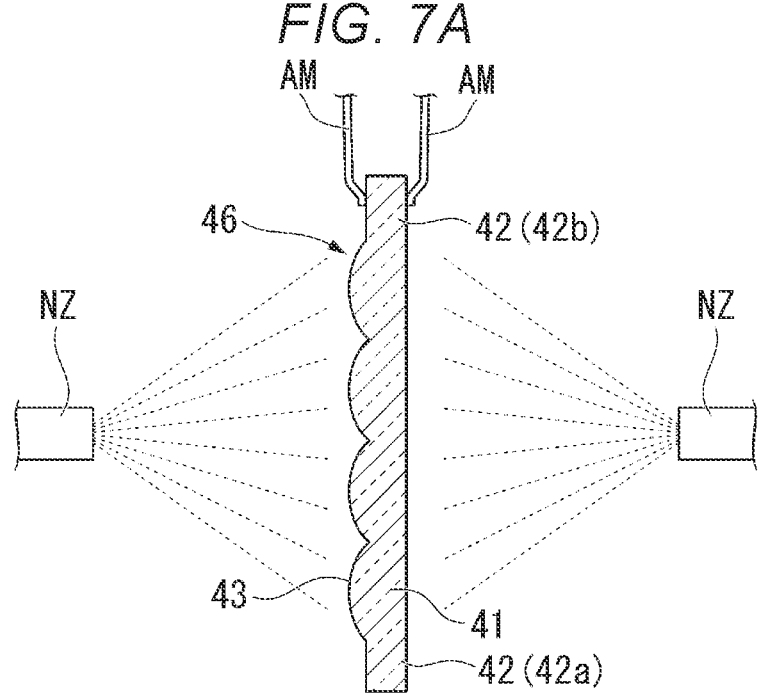
FIG. 7A is a diagram showing a configuration example of performing spray coating on both surfaces of the optical component.
Figure 7B:
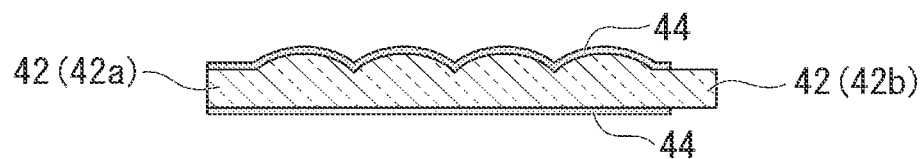
FIG. 7B is a diagram showing a functional layer formed by the spray coating shown in FIG. 7A.

There is hereinafter described when using the spray coating method with reference to the drawings. FIG. 6A and FIG. 6B show a configuration when performing the spray coating at one surface side of the lens main body 46, and FIG. 7A and FIG. 7B show a configuration when performing the spray coating at both surface sides of the lens main body 46.

As shown in FIG. 6A, for example, by performing the spray coating only at one surface side (the multi-lens surface 43 side) of the lens main body 46 supported by the arm part AM in the second region 42b from a nozzle NZ, the functional layer 44 is formed thereon.

The functional layer 44 formed in such a manner is formed in the state of covering only the multi-lens surface 43 side of the optical part 41 as shown in FIG. 6B. Further, the functional layer 44 is formed in the state of covering the surface at the multi-lens surface 43 side in the first region 42a of the support part 42, and the portion at the lower side of the portion supported by the arm part AM at the multi-lens surface 43 side of the second region 42b thereof.

In other words, when performing the spray coating at the multi-lens surface 43 side of the lens main body 46, it is possible to manufacture the first multi-lens array 21 and the second multi-lens array 22 each provided with the functional layer 44 disposed so as to cover at least the multi-lens surface 43 of the optical part 41, and at the same time, so as not to cover at least a part of the support part 42.

Further, it is possible to form the functional layers 44 by performing the spray coating at the both surface sides of the lens main body 46 supported by the arm part AM in the second region 42b from the nozzles NZ as shown in FIG. 7A. The functional layers 44 formed in such a manner are formed in the state of covering both surface sides of the optical part 41 as shown in FIG. 7B. Further, the functional layers 44 are formed in the state of covering the both surfaces of the first region 42a of the support part 42, and portions at the lower side of the portions supported by the arm part AM at the both surface sides of the second region 42b thereof.

In other words, when performing the spray coating at the both surface sides of the lens main body 46, it is possible to manufacture the first multi-lens array 21 and the second multi-lens array 22 each provided with the functional layers 44 disposed so as to cover at least the multi-lens surface 43 of the optical part 41, and at the same time, so as not to cover at least a part of the support part 42.

Further, there is cited when supporting the second region 42b located at one side of the support part 42 with the arm part AM when forming the film of the functional layer 44 as an example in the embodiment described above, but it is possible to arrange to form the film of the functional layer 44 while supporting the first region 42a located at the other side of the support part 42 with the arm part AM. In this case, in each of the first multi-lens array 21 and the second multi-lens array 22, the functional layer 44 is disposed in the state of not covering a part of the first region 42a.

Further, there is cited when the support part 42 includes the first region 42a and the second region 42b as an example in the first multi-lens array 21 and the second multi-lens array 22 in the embodiment described above, but it is possible to adopt a structure having only either one of the first region 42a and the second region 42b.

Figure 8:
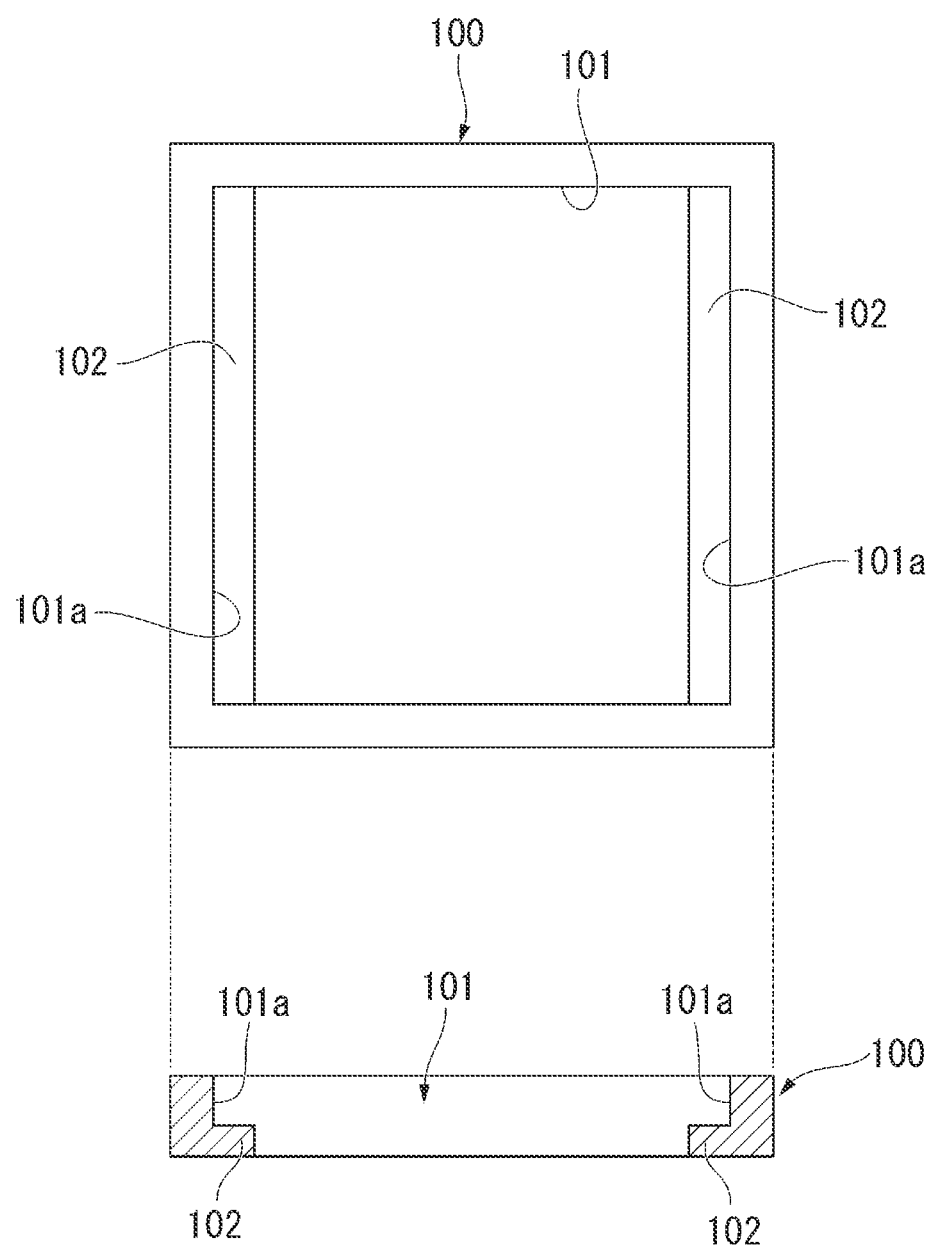
FIG. 8 is a diagram showing a configuration of a supporting jig used when forming the functional layer by evaporation coating.
Figure 9:
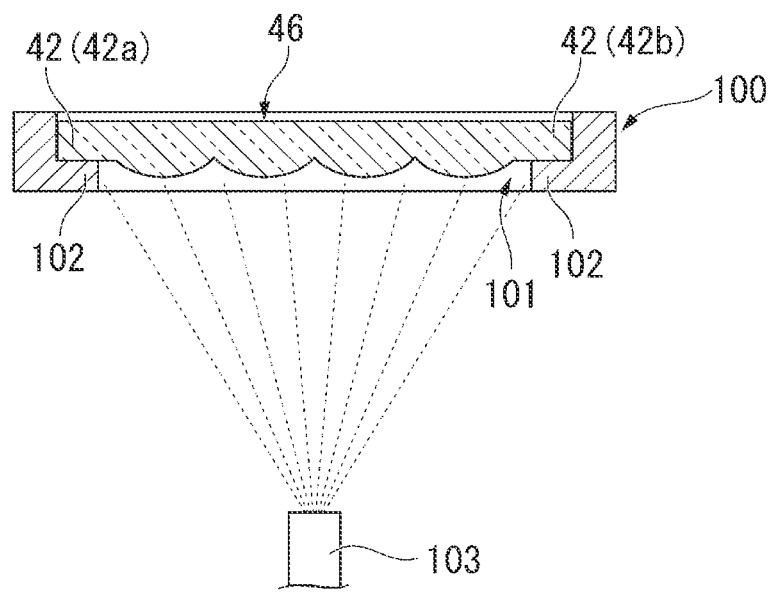
FIG. 9 is a diagram showing a film formation step by the evaporation coating.
Figure 10:
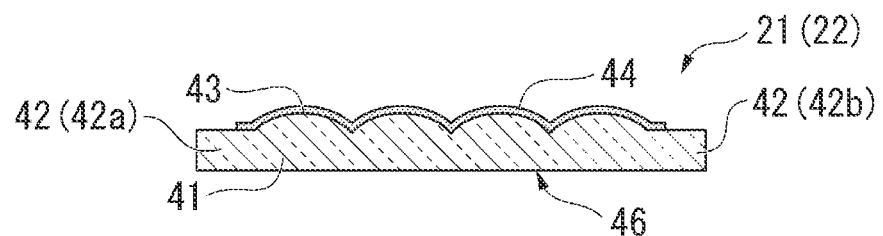
FIG. 10 is a cross-sectional view of a multi-lens array formed by the evaporation coating shown in FIG. 9.

Further, it is possible to form the film of the functional layer 44 using evaporation coating. FIG. 8 is a diagram showing a configuration of a supporting jig used when forming the functional layer 44 by the evaporation coating. FIG. 9 is a diagram showing a film formation step by the evaporation coating. FIG. 10 is a cross-sectional view of the first multi-lens array 21 having the functional layer 44 formed using the supporting jig. It should be noted that an upper part of FIG. 8 is a front view of the supporting jig, and a lower part is a cross-sectional view of the supporting jig.

As shown in FIG. 8, the supporting jig (the support body) 100 has a substantially frame-like planar shape. The supporting jig 100 has projecting parts 102 respectively disposed in lower parts of a pair of inner side surfaces 101a opposed to each other across an opening part 101.

As shown in FIG. 9, the supporting jig 100 supports the first region 42a and the second region 42b to thereby hold the lens main body 46. The lens main body 46 is supported by the supporting jig 100 in the state in which the multi-lens surface 43 is exposed inside the opening part 101. In other words, in the present aspect, both of the first region 42a and the second region 42b are supported by the support body, namely the projecting parts 102 of the supporting jig 100.

Then, by performing the evaporation coating with the functional layer formation material from the evaporation source 103, the film of the functional layer 44 is formed on the multi-lens surface 43.

The functional layer 44 formed in such a manner is formed in the state of covering only the multi-lens surface 43 side of the optical part 41 as shown in FIG. 10. Further, the functional layer 44 is formed in the state of covering a region which is not supported by the supporting jig 100 (the projecting parts 102) in the surface at the multi-lens surface 43 side in each of the first region 42a and the second region 42b of the support part 42. In other words, also when forming the film of the functional layer 44 with the evaporation method using the supporting jig 100, it is possible to manufacture the first multi-lens array 21 and the second multi-lens array 22 each provided with the functional layer 44 disposed so as to cover at least the multi-lens surface 43 of the optical part 41, and at the same time, so as not to cover at least a part of the support part 42.

Figure 11:
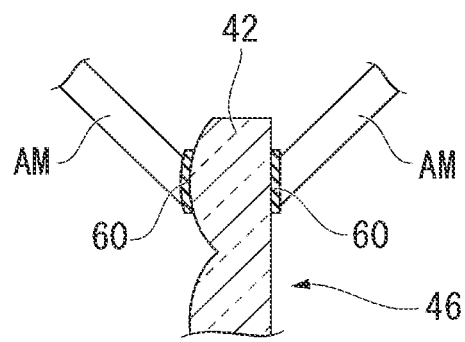
FIG. 11 is a diagram showing a modified example when the support part is not a planar part.

Further, there is cited when the support part 42 (the first region 42a and the second region 42b) includes the planar part in the embodiment described above, but it is possible for the support part 42 to have a shape other than the planar part. When the support part 42 has the shape other than the planar part, for example, by disposing a viscoelastic body (elastomer) 60 at the tip of the arm part AM, namely in the portions making contact with the support part 42, as shown in FIG. 11, it becomes possible to stably grasp the support part 42 following the shape of the support part 42. Further, since the frictional force also increases by using the viscoelastic body 60, it is possible to prevent the lens main body 46 from dropping.

It should be noted that it is possible for one of the first region 42a and the second region 42b to be formed of the planar part, and for the other of the first region 42a and the second region 42b to be formed of the shape other than the planar part.

Further, there is cited when applying the optical element according to the present disclosure to the multi-lens array as an example in the embodiment described above, but the optical element according to the present disclosure can be applied not only to the multi-lens array, but also to other lenses such as a condenser lens, and a polarization element.

Besides the above, the specific descriptions of the shape, the number, the arrangement, the material, and so on of the constituents of the light source device and the projector are not limited to those in the embodiment described above, but can properly be modified. Although in the embodiment described above, there is described the example of installing the light source device including the optical elements according to the present disclosure in the projector using the liquid crystal light valves, the example is not a limitation. The light source device including the optical element according to the present disclosure can also be applied to a projector using digital micromirror devices as the light modulation devices. Further, the projector is not required to have a plurality of light modulation devices, and can be provided with just one light modulation device.

Although in the embodiment described above, there is described the example of applying the light source device including the optical element according to the present disclosure to the projector, the example is not a limitation. The light source device including the optical element according to the present disclosure can also be applied to lighting equipment, a headlight of a vehicle, and so on.

An optical element according to an aspect of the present disclosure may have the following configuration.

The optical element according to the aspect of the present disclosure includes a main body part including an optical part having an optical surface, and a support part which is provided to the optical part, and which is to be supported by a support body, and a functional layer which is provided as a film to the main body part, and which has a function which is predetermined, wherein the functional layer is disposed so as to cover at least the optical surface of the optical part, and so as not to cover at least a part of the support part.

In the optical element according to the aspect of the present disclosure, there may be adopted a configuration in which a planar shape of the optical part is a rectangular shape, the optical part has a first end side part along a first direction, and a second end side part along a second direction crossing the first direction, and the support part is provided to one of the first end side part and the second end side part.

In the optical element according to the aspect of the present disclosure, there may be adopted a configuration in which the support part is disposed throughout an entire area of one of the first end side part and the second end side part.

In the optical element according to the aspect of the present disclosure, there may be adopted a configuration in which the optical part is a lens.

In the optical element according to the aspect of the present disclosure, there may be adopted a configuration in which the lens is a multi-lens having a multi-lens surface constituted by a plurality of lens surfaces as the optical surface.

In the optical element according to the aspect of the present disclosure, there may be adopted a configuration in which the support part includes a planar part.

In the optical element according to the aspect of the present disclosure, there may be adopted a configuration in which the optical part and the support part are disposed so that respective end parts cross each other with an obtuse angle.

In the optical element according to the aspect of the present disclosure, there may be adopted a configuration in which the functional layer includes a planarization film configured to planarize the optical surface.

A method of manufacturing an optical element according to another aspect of the present disclosure may have the following configuration.

The method of manufacturing the optical element according to another aspect of the present disclosure is a method of manufacturing an optical element having a main body part including an optical part and a support part, and a functional layer, the method including a film formation step of providing a film of the functional layer to the main body part, wherein in the film formation step, the support part is supported by a support body to thereby hold the main body part, and the functional layer is provided to the main body part so as to cover at least the optical surface of the optical part, and so as not to cover at least a part at an optical surface side of the support part.

A projector according to another aspect of the present disclosure may have the following configuration.

The projector according to another aspect of the present disclosure includes a light source device including the optical element according to the above aspect of the present disclosure, a light modulation device configured to modulate light from the light source device in accordance with image information, and a projection optical device configured to project the light modulated by the light modulation device.

In the projector according to the above aspect of the present disclosure, there may further be included a support member configured to support the optical element, wherein the optical element is supported in the support part by the support member.

What is claimed is:

1. An optical element comprising:
  a main body part including
    an optical part having an optical surface, a first end side part along a first direction, and a second end side part along a second direction crossing the first direction, and
    a support part which is provided to one of the first end side part and the second end side part of the optical part, and which is to be supported by a support body; and
  a film layer which is provided to the main body part, wherein
  a planar shape of the optical part is a rectangular shape, and
  the film layer is disposed so as to cover the optical surface of the optical part, and so as not to cover at least a part of the support part.

2. The optical element according to claim 1, wherein the support part is disposed throughout an entire area of one of the first end side part and the second end side part.

3. The optical element according to claim 1, wherein the optical part is a lens.

4. The optical element according to claim 3, wherein the lens is a multi-lens having a multi-lens surface constituted by a plurality of lens surfaces as the optical surface.

5. The optical element according to claim 1, wherein the support part includes a planar part.

6. The optical element according to claim 5, wherein the optical part and the support part are disposed so that respective end surfaces cross each other with an obtuse angle.

7. The optical element according to claim 1, wherein the functional layer includes a planarization film configured to planarize the optical surface.

8. A projector comprising:
  a light source device including the optical element according to claim 1;
  a light modulation device configured to modulate light from the light source device in accordance with image information; and
  a projection optical device configured to project the light modulated by the light modulation device.

9. The projector according to claim 8, further comprising:
  a support member configured to support the optical element, wherein
  the optical element is supported in the support part by the support member.

10. A method of manufacturing an optical element having a main body part including an optical part and a support part, and a film layer, the method comprising:
  a film formation step of providing a film of the film layer to the main body part, wherein
  in the film formation step, the support part is supported by a support body to thereby hold the main body part, and the film layer is provided to the main body part so as to cover an optical surface of the optical part, and so as not to cover at least a part at an optical surface side of the support part, wherein
  a planar shape of the optical part is a rectangular shape,
  the optical part includes a first end side part along a first direction and a second end side part along a second direction crossing the first direction, and
  the support part is provided to one of the first end side part and the second end side part.

11. An optical element comprising:
  a main body part including an optical part having an optical surface, and a support part which is provided to the optical part, and which is to be supported by a support body; and
  a film layer which is provided to the main body part, wherein
  the film layer is disposed so as to cover the optical surface of the optical part, and so as not to cover at least a part of the support part, wherein the optical part and the support part are disposed so that respective end surfaces cross each other with an obtuse angle.

12. A projector comprising:
a light source device including the optical element according to claim 11;
a light modulation device configured to modulate light from the light source device in accordance with image information; and
a projection optical device configured to project the light modulated by the light modulation device.

13. A method of manufacturing an optical element having a main body part including an optical part and a support part, and a film layer, the method comprising:
supporting the support part by a support body to thereby hold the main body part; and
providing the film layer to the main body part so as to cover an optical surface of the optical part, and so as not to cover at least a part at an optical surface side of the support part, wherein
the optical part and the support part are disposed so that respective end surfaces cross each other with an obtuse angle.

* * * * *

UNITED STATES PATENT AND TRADEMARK OFFICE
CERTIFICATE OF CORRECTION

PATENT NO. : 11,681,212 B2
APPLICATION NO. : 17/331692
DATED : June 20, 2023
INVENTOR(S) : Kei Tadachi It is certified that error appears in the above-identified patent and that said Letters Patent is hereby corrected as shown below:

On the Title Page

Item (73), please change the Assignee from "Seiko Epson Corportation, Tokyo (JP)" to "Seiko Epson Corporation, Tokyo (JP)".

Signed and Sealed this
Fifth Day of September, 2023

Katherine Kelly Vidal
*Director of the United States Patent and Trademark Office*